US012126639B2

(12) United States Patent
Jiang et al.

(10) Patent No.: US 12,126,639 B2
(45) Date of Patent: Oct. 22, 2024

(54) SYSTEM AND METHOD FOR LOCATING DGA COMPROMISED IP ADDRESSES

(71) Applicant: Palo Alto Networks, Inc., Santa Clara, CA (US)

(72) Inventors: Weihan Jiang, San Jose, CA (US); David Qianshan He, Cupertino, CA (US); Xuya Jiang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 147 days.

(21) Appl. No.: 17/735,896

(22) Filed: May 3, 2022

(65) Prior Publication Data

US 2023/0362176 A1 Nov. 9, 2023

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ............ H04L 63/1416; H04L 63/1425
See application file for complete search history.

(56) References Cited

U.S. PATENT DOCUMENTS

| | | | | |
|---|---|---|---|---|
| 9,516,039 | B1* | 12/2016 | Yen | H04L 63/1425 |
| 2012/0084860 | A1* | 4/2012 | Cao | H04L 63/1441 726/23 |
| 2016/0057165 | A1* | 2/2016 | Thakar | H04L 63/1425 726/24 |
| 2017/0163603 | A1* | 6/2017 | Xu | H04L 41/40 |
| 2018/0176232 | A1* | 6/2018 | Rodriguez | H04L 61/4511 |
| 2018/0351972 | A1* | 12/2018 | Yu | H04L 63/1416 |
| 2019/0058717 | A1* | 2/2019 | Chailytko | H04L 63/145 |
| 2019/0238562 | A1* | 8/2019 | Manadhata | H04L 61/3025 |
| 2019/0253435 | A1* | 8/2019 | Machlica | H04L 63/1408 |

FOREIGN PATENT DOCUMENTS

SG 10202100813 A1 * 2/2021 .......... G06F 17/141

OTHER PUBLICATIONS

Curtin., et al. 'Detecting DGA domains with recurrent neural networks and side information.' Proceedings of the 14th International Conference on Availability, Reliability and Security. 2019.
Highnam et al. 'Real-time detection of dictionary dga network traffic using deep learning.' SN Computer Science 2.2 (2021): 1-17.
Yu et al. 'Character level based detection of DGA domain names.' 2018 international joint conference on neural networks (IJCNN). IEEE, 2018.

* cited by examiner

*Primary Examiner* — Vance M Little
*Assistant Examiner* — James P Moles
(74) *Attorney, Agent, or Firm* — Van Pelt, Yi & James LLP

(57) ABSTRACT

A system and method for locating DGA compromised IP addresses is provided. A domain name system (DNS) stream is received. The DNS stream is classified into DGA generated domains using a machine learning classifier to generate a classification output. User behavior profiling is performed to enhance the classification output. A verdict is generated based on the user behavior profiling of the classification output including identifying a compromised source IP address associated with a detected DGA malware attack.

12 Claims, 11 Drawing Sheets intgmxdeadnxuyla.com (CryptoLocker)
axwscwsslmiagfah.com (CryptoLocker)
facebook.com
paloaltonetworks.com

FIG. 4A heavenpatternleader.net (Suppobox)
facebook.com
paloaltonetworks.com
shareleaderspace.net (Suppobox)

FIG. 4B

SYSTEM AND METHOD FOR LOCATING DGA COMPROMISED IP ADDRESSES

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 4A is an example of a list of domains generated by a compromised IP address.

FIG. 4B is another example of a list of domains generated by a compromised IP address.

DETAILED DESCRIPTION

Figure 1:
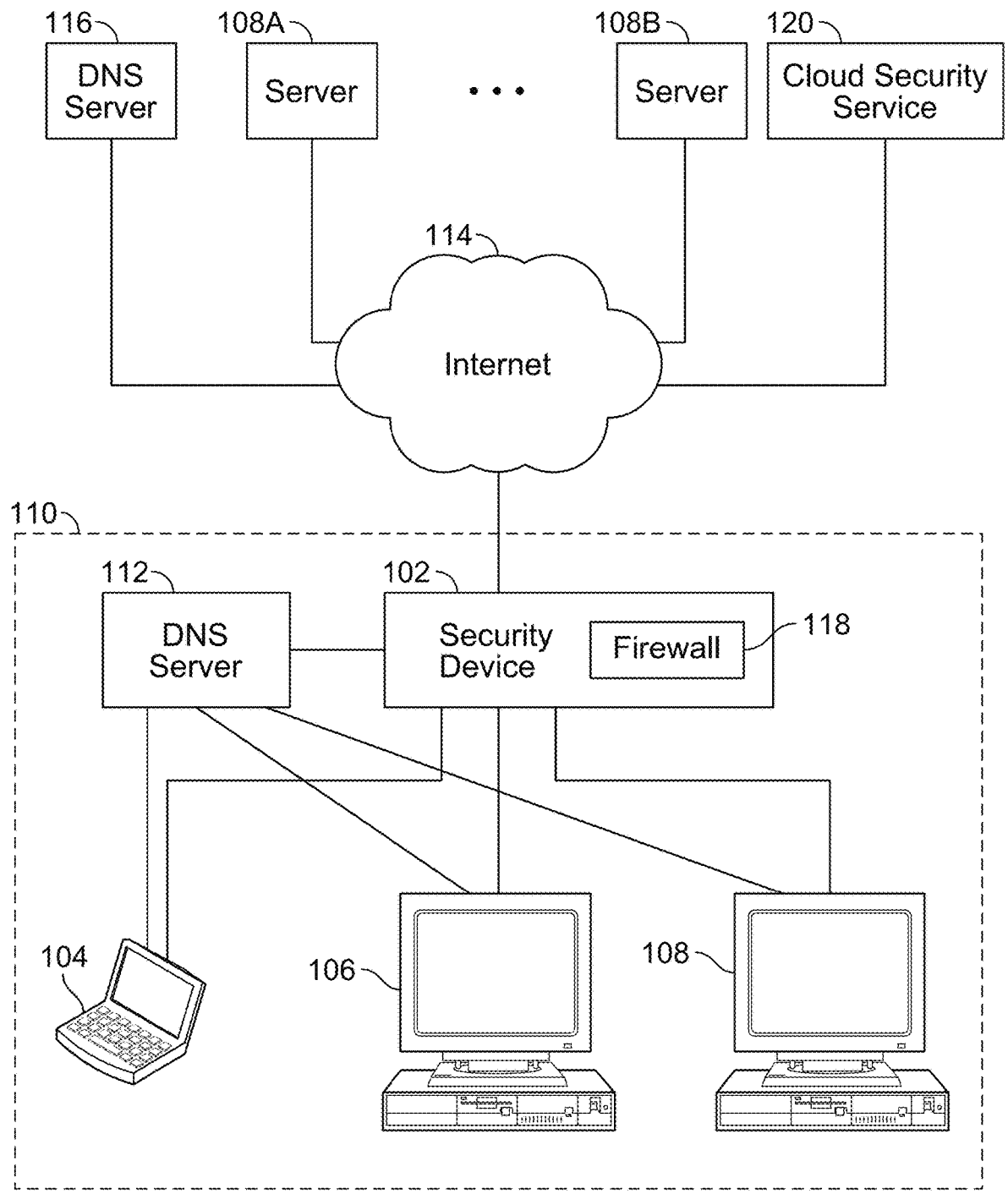
FIG. 1 is a functional block diagram illustrating an architecture for Domain Generation Algorithm (DGA) behavior detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPv4) and 2001:db8:0:1234:0:567:8:1 (for IPv6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN (e.g., an NXDOMAIN response received in response to a DNS query for a given domain name) is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnet-site.com. Various commercial efforts as well as open project efforts exist to provide listings of network domains (e.g., bad/malware domains) that are known to be used to distribute or propagate malware. Some approaches use such network domain listings (e.g., bad/malware domain listings) to provide spoofed replies, in response to any requests to a network domain on such a listing, as a mechanism for preventing propagation of malware distribution.

Blackholing is a technique that can be used to send all traffic (e.g., network communications) to a network domain (e.g., DNS or IP address) of a null interface or non-existent server (e.g., sometimes referred to as a black hole). For example, an Internet Service Provider (ISP) can manage such blackholing for efficiency and to avoid affecting network connectivity. However, while blackholing may be efficient for certain types of severe network attacks, such an approach fails to allow for analysis of the traffic to the blackholed network domain.

Sinkholing generally refers to a technique for routing traffic (e.g., network communications) to a valid IP address. For example, a security device (e.g., a network device, which can be implemented using a server or appliance) associated with the valid IP address can receive the traffic that was directed (e.g., redirected) to the sinkholed IP address that is associated with the network domain. The security device that receives the traffic can analyze the traffic. Based on the analysis of the traffic, the security device can then perform an action (e.g., reject bad packets or perform some other action).

For example, malware, such as C&C malware and/or other types of malware, can generate many different network domains, such as by using Domain Generation Algorithms (DGAs). Generally, malware utilizes the DGA approach to generate many different domain names for evasion detection purposes and take-down evasion purposes, and that are not actually or frequently used to attempt to connect to by many or any of the malware samples executing in the wild.

However, existing approaches fail to accurately and/or efficiently identify DGA behavior on a network (e.g., an enterprise IP-based network or other network). Also, existing approaches fail to determine whether a given host device that is sending DNS queries to non-existent network domains (e.g., NXDOMAINs) may be infected with DGA malware (e.g., including a previously new or not yet identified, known version of DGA malware executing on the host device).

What are needed are new and improved techniques for identifying and monitoring DGA behavior on a network.

Accordingly, techniques for Domain Generation Algorithm (DGA) behavior detection are provided.

In some embodiments, a system/method/computer program product for providing DNS security using process information includes receiving a domain name system (DNS) stream; classifying the DNS stream into DGA generated domains using a machine learning classifier to generate a classification output; performing user behavior profiling to enhance the classification output; and generating a verdict based on the user behavior profiling of the classification output including identifying a compromised source IP address associated with a detected DGA malware attack.

In some embodiments, the DNS stream includes logs obtained from a plurality of network security devices.

In some embodiments, the DNS stream includes a plurality of events, wherein each event of the plurality of events comprises a DNS request and a source IP address.

In some embodiments, the classifying of the DNS stream into DGA generated domains includes classifying the DNS stream into the DGA generated domains using a dictionary-based DGA.

In some embodiments, the performing of the user behavior profiling to enhance the classification output includes clustering DGA generated domains having a same source IP address.

In some embodiments, the performing of the user behavior profiling to enhance the classification output includes clustering DGA generated domains having a same source IP address for a period of time to obtain a DGA domain cluster.

In some embodiments, the DNS stream includes a plurality of events, each event of the plurality of events including a DNS request and a source IP address; the performing of the user behavior profiling includes clustering DGA generated domains having a same source IP address to obtain a DGA domain cluster; and the generating of the verdict includes comparing a number of domains in the DGA domain cluster with a predefined threshold; and in response to a determination that the number of domains in the DGA domain cluster is equal to or exceeds the predefined threshold, determining that the source IP address associated with the DGA domain cluster is the compromised source IP address.

In some embodiments, the processor is further configured to block the compromised source IP address associated with the detected DGA malware attack.

In some embodiments, the processor is further configured to generate an alert including the identification of the compromised source IP address.

In some embodiments, the processor is further configured to quarantine the compromised source IP address associated with the detected DGA malware attack.

In some embodiments, the generating of the verdict includes generating the verdict in near real-time.

In some embodiments, the processor is further configured to generate visualizations, reports, and/or alerts based on the verdict.

Accordingly, new and improved security solutions that facilitate Domain Generation Algorithm (DGA) behavior detection using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

FIG. 1 is a functional block diagram illustrating an architecture for Domain Generation Algorithm (DGA) behavior detection in accordance with some embodiments. As shown, a security device 102 is at the perimeter of a protected network 110 (e.g., an enterprise network), which includes client devices (e.g., clients) 104, 106, and 108. For example, security device 102 can include a firewall function, such as firewall 118 as shown, to protect the network and various computing devices (e.g., client devices, servers, and/or other computing devices) within network 110, which is in communication with the Internet 114 and various servers, such as DNS server 116, and other Internet resources/servers shown as 108A and 108B (e.g., web servers, mail servers, file servers such as an FTP server, and/or other types of resources/servers). For example, security device 102 can be implemented as a data appliance or a server that can perform various security functions, including firewall 118. Security device 102 is also in communication with a cloud security service 120 via Internet 114 as shown. In some implementations, the security device 102 is implemented using a data appliance (e.g., a security appliance), a gateway (e.g., a security server), a server (e.g., a server that executes security software including firewall 118), and/or some other security device, which, for example, can be implemented using computing hardware, software, or various combinations thereof.

In some implementations, one or more of clients 104, 106, and 108 can include a firewall (e.g., host-based firewall). For example, clients 104, 106, and 108 can include various computing devices that can access the Internet via wired and/or wireless communications, such as computers, laptops, tablets, smart phones, and/or various other types of computing devices with network communication capabilities. As is also shown, Internet resources/servers shown as 108A and 108B are in communication with the Internet 114. For example, a client device can access a service provided by a server via the Internet, such as a web related service (e.g., web sites, cloud-based services, streaming services, or email services), peer-to-peer related service (e.g., file sharing), IRC service (e.g., chat service), and/or any other service that can be delivered via the Internet.

As is also shown in FIG. 1, clients 104, 106, and 108 are also in communication with a local DNS server 112 of network 110. For example, DNS server 112 can perform a DNS service to translate a domain name into an IP address. For example, when a user types in a domain name (e.g., an Internet or Intranet domain name), such as example.com, using a web browser on a client (e.g., client 104, 106, or 108), an authoritative DNS server can translate the domain name into an IP address, such as 172.16.254.1 (for IPv4) and 2001:db8:0:1234:0:567:8:1 (for IPv6). If DNS server 112 does not have a locally cached result for the requested domain name, then DNS server 112 can communicate to another DNS server, such as DNS server 116 via Internet 114 to obtain the translation for the domain name into an IP address (e.g., note that the communication between DNS server 112 and DNS server 116 passes through security device 102 as shown). In contrast, DNS requests from clients 104, 106, and 108 to local DNS server 112 are not required to pass through security device 102 as shown for the network architecture for network 110. As similarly discussed above, if a user or client attempts to perform a DNS lookup or host command on an unregistered or invalid domain name, such as examplefakedomain.com, then an error can be received indicating that such is a non-existing domain name, or in other words, that such is a non-existent domain (NXDOMAIN).

In particular, security device 102 can be used for implementing various techniques for DGA behavior detection as described herein with respect to various embodiments. For example, security device 102 can detect DGA behavior. As another example, security device 102 can facilitate sinkholing of a network domain (e.g., a bad network domain).

In one embodiment, sinkholing bad network domains using the disclosed techniques can be implemented using security device 102 and cloud security service 120. For example, security device 102 (e.g., an integrated security appliance/gateway/server) can communicate with cloud security service 120 (e.g., using secure communications, such as encrypted communication techniques using standard or well-known encryption protocols) to receive security related content updates (e.g., DNS related signature(s), bad network domain related signature(s), and/or policy(ies)/rule(s)) and/or to provide malware samples, logged information (e.g., logged attempts to communicate to bad network domains observed based on triggered bad network domain signatures and/or DNS/IPS signatures), and/or other information. As another example, cloud security service 120 (e.g., using secure communications, such as encrypted communication techniques using standard or well-known encryption protocols) can report (e.g., to a network or security administrator associated with network 110) that a host (e.g., client device 104, 106, or 108) is infected with malware based on a logged attempt(s) by that host(s) to communicate with a sinkholed IP address that is associated with a bad network domain. As will now be apparent, some or all of the functions described above with respect to FIG. 1 can be assisted by or implemented in whole or in part by cloud security service 120. In some implementations, cloud security service 120 can, for example, reduce the processing on security device 102.

Figure 2:
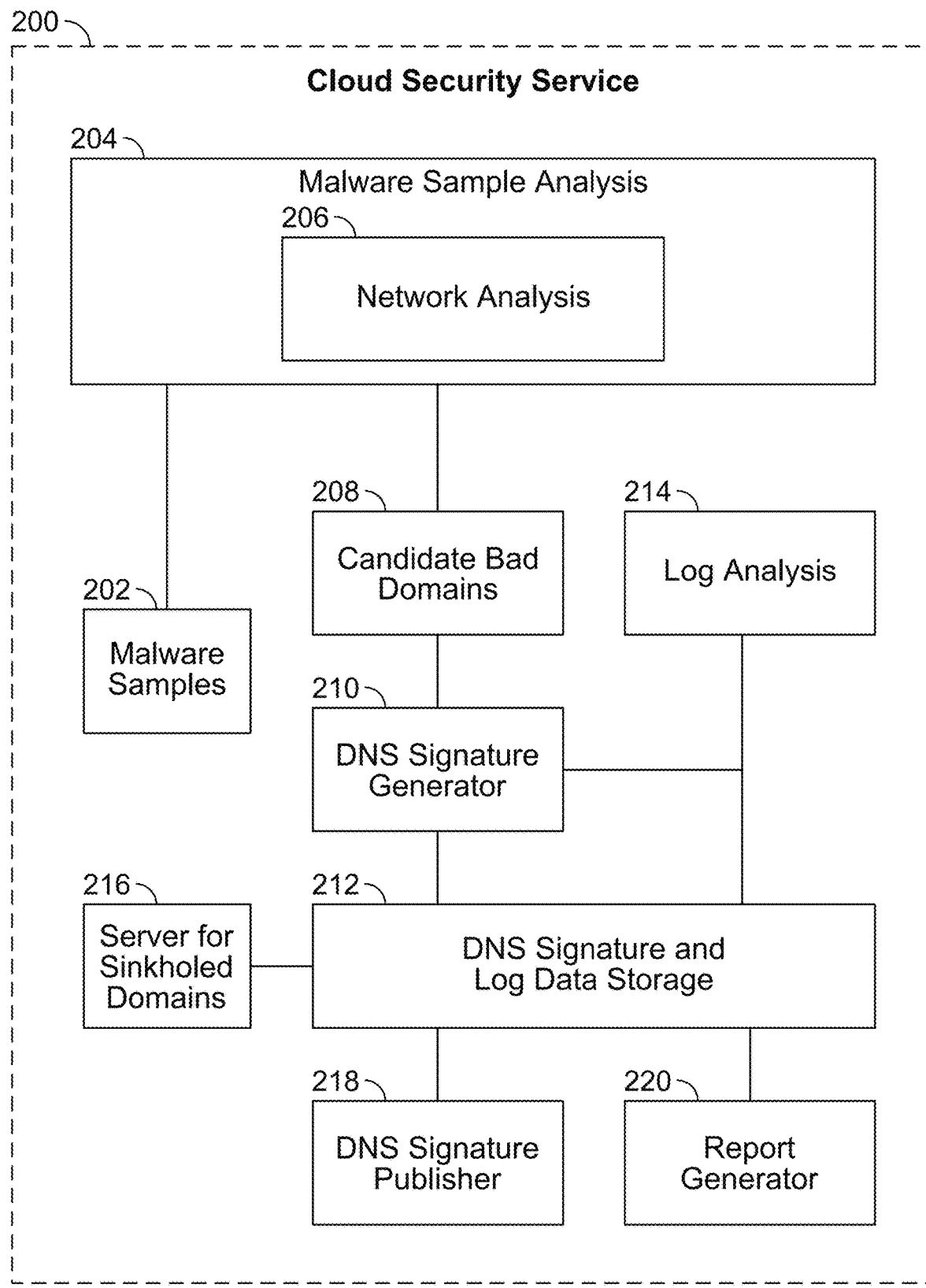
FIG. 2 is a functional block diagram illustrating a cloud security service for DGA behavior detection in accordance with some embodiments.

FIG. 2 is a functional block diagram illustrating a cloud security service for DGA behavior detection in accordance with some embodiments. In particular, cloud security service 200 is in communication with the Internet. For example, cloud security service 120 of FIG. 1 can be implemented as cloud security service 200 as shown in FIG. 2.

Referring to FIG. 2, cloud security service 200 includes malware samples 202 (e.g., executable files, Microsoft Office® files, Adobe PDF® files, Java files, and/or other types of files), which can be received from various customers (e.g., firewall 118 as shown in FIG. 1 and/or other firewalls or security devices from one or more customers of the cloud security service). Malware samples 202 are provided to malware sample analysis 204. Malware sample analysis 204 includes a network analysis component 206. For example, when executing a malware sample using the malware sample analysis 204, which can be implemented as a virtualized environment for dynamic analysis of malware, whether the malware sample is determined to be malware can be performed using various malware detection techniques (e.g., based on identification of malicious behaviors, such as malicious network activity, exploits, software vulnerabilities, and/or other malicious behaviors including using heuristic-based behavioral analysis techniques). For example, if a malware sample is determined to be malware based on the malware sample analysis, the malware sample can be identified and a new malware signature can be automatically generated, which can be distributed to security devices that receive malware signature updates. Also, malware sample analysis 204, using network analysis component 206, can identify malware domains (if any) that the malware sample attempts to access, which can be logged and sent to candidate bad network domains 208 (e.g., by logging all DNS/domain query traffic during emulation of the identified malware, which generates a source of candidate bad network domains list associated with the identified malware). For example, whether each of the candidate bad network domains has been registered (e.g., by the malware developer) can be determined (e.g., if a DNS lookup receives an NXDOMAIN response, then it can be determined that the candidate bad network domain has not been registered). In some implementations, the cloud security service can register any such unregistered bad network domains to sinkhole such bad network domains (e.g., using sinkholed IP addresses, that is, valid IP addresses that are associated with, for example, one or more servers controlled by cloud security service 200, such as server 216 as shown). This approach also can uniquely associate an identified malware sample with one or more bad network domains, such that a host attempt to connect to such bad network domains (e.g., NXDOMAINS) can be used to determine that such hosts are infected with the identified malware sample (e.g., an identified DGA/C&C malware sample). For example, such signatures are triggered by a client device (e.g., client device 104, 106, or 108 as shown in FIG. 1) attempting to connect to such an NXDOMAIN that triggers a signature implemented by the local firewall (e.g., firewall 118 as shown in FIG. 1), which can then also be used to determine that the client device is infected with identified malware, such that a responsive action can be performed (e.g., the client device can be disinfected, quarantined, reported to a network/security administrator for the network, the client device's attempt(s) to connect to the bad network domains(s) can be blocked, and/or some other responsive action can be performed based on policy, such as a firewall policy).

In other cases, further analysis can be performed to determine which of the bad network domains should be identified for DNS signatures and/or registered for sinkholing, as further described below. In some implementations, cloud security service 200 uses a signature generator 210 to generate signatures for bad domains 208 detected based on monitoring one or more malware samples using the disclosed techniques, such as further described below. These signatures are stored in a DNS signature and log data storage 212 (e.g., in some implementations, log data and signature data can be stored in separate data stores, such as different databases or other types of data stores) and can be distributed to security devices (e.g., security devices that include firewalls, such as security device 102 of FIG. 1) of customers of cloud security service 200 using a signature publisher 218. For example, if during emulation analysis of malware-Sample-X (e.g., including logging DNS traffic during an instrumented virtualized emulation of malware-Sample-X), that malware sample attempts to connect to malware-bad-site-1.com, malware-bad-site-2.com, and malware-bad-site-3.com, then signatures (e.g., DNS signatures) can be generated for each of those candidate bad network domains. These signatures can be sent to firewalls of multiple customers of cloud security service 200, which can then log and report back to cloud security service 200 any attempts that such customer firewalls identify hosts attempting to connect to any of such bad network domains, which can also be stored in signature and log data storage 212. In an example implementation, log analysis engine 214 can also periodically analyze such received log data to determine which of such logged bad network domains are bad network domains that malware-Sample-X (e.g., executing in the wild) actually attempts or more commonly attempts to connect to in order to focus on such logged bad network domains for sinkholing. Based on this further analysis to focus on the most relevant/commonly observed in the wild bad network domains, the cloud security service can then register such unregistered bad network domains, or (if already registered by the malware developer) attempt to change the registration, to sinkhole such bad network domains (e.g., using sinkholed IP addresses that are associated with one or more servers controlled by cloud security service 200, such as server 216 as shown). Thus, such further analysis can be used to determine which of the candidate bad network domains should be registered for sinkholing, which can be a more efficient approach as malware sometimes uses DGA techniques and other malware detection evasion techniques as discussed above. Accordingly, this approach allows cloud security service 200 to selectively register or change DNS registrations on bad network domains that were observed to have exceeded, for example, a threshold number of attempted hits (e.g., queries for attempted connections, such as during a predefined period of time) by hosts (e.g., infected with the identified malware performing in the wild).

As is also shown in FIG. 2, cloud security service 200 provides a server 216 (e.g., or multiple servers or appliances) that can be associated with one or more sinkholed IP addresses for bad network domains using the above-described techniques. Any attempts by hosts (e.g., clients 104, 106, or 108 as shown in FIG. 1, or other hosts, even if such are hosts that are not associated with customers of the cloud security service, assuming that a given bad network domain is registered to a sinkholed IP address associated with the cloud security service provider) can be determined using server for sinkholed domains 216 and logged to DNS signature and log data storage 212 (e.g., or in some implementations, stored in a separate data store). Report generator (reporting) component 220 is configured to automatically report to customers (e.g., or others who may not be current customers) whose host(s) are infected with identified malware based on logged attempts to connect to sinkholed IP addresses that are associated with bad network domains.

As another example, a security device (e.g., security device 102 as shown in FIG. 1) can monitor network communications from hosts (e.g., host devices, such as a computer, laptop, tablet, smart phone, server, and/or another type of computing device) and apply a DNS signature that can determine whether to redirect a request to connect to a given domain name to a sinkholed IP address (e.g., associated with server for sinkholed domains 216 of cloud security service 200 as shown in FIG. 2). As such, network communications from hosts that are redirected to the sinkholed IP address can be analyzed by the cloud security service, which can then, for example, determine which host devices attempted to connect to that bad network domain (e.g., log which clients attempted to connect to the bad network domain and how many times) and/or perform various other actions. In this example implementation, the cloud security service provides the computing device that is configured with the sinkholed IP address (e.g., server for sinkholed domains 216 of cloud security service 200 as shown in FIG. 2), and the security device (e.g., security device 102 as shown in FIG. 1) is further configured to not provide any response to requests from the infected hosts except for completing an initial connection setup (e.g., TCP handshake).

Figure 3:
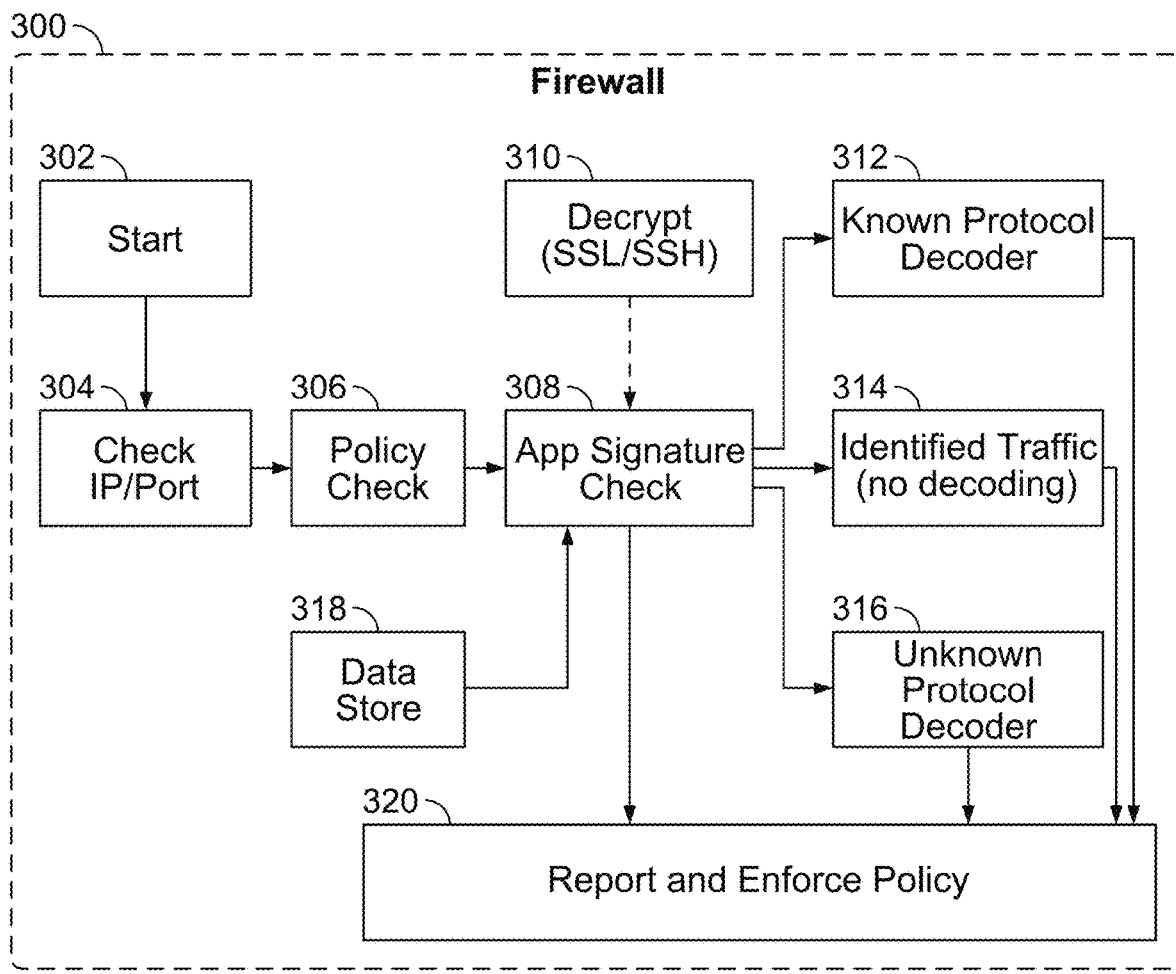
FIG. 3 is a functional block diagram illustrating a firewall for DGA behavior detection in accordance with some embodiments.

FIG. 3 is a functional block diagram illustrating a firewall for DGA behavior detection in accordance with some embodiments. In particular, security device 300 is in communication with the Internet. For example, firewall 118 of FIG. 1 can be implemented as firewall 300 as shown in FIG. 3.

In one embodiment, network traffic is monitored using a server (e.g., a computer server that includes security functions, such as a firewall executed on a processor(s) of the computer server). In one embodiment, network traffic is monitored using an appliance (e.g., a data appliance that includes security functions, such as a security appliance that includes a firewall executed on a processor(s) of the appliance). In one embodiment, network traffic is monitored using a gateway (e.g., a gateway that includes security functions, such as a security gateway). In one embodiment, network traffic is monitored using a host (e.g., security software executed on a host device, such as a network server or client computing device, such as a personal computer, laptop, tablet, or smart phone). In one embodiment, the network traffic is monitored using pass through (e.g., in-line) monitoring techniques. In one embodiment, the network traffic is collected and/or monitored for events and/or reporting based on events (e.g., some of the network traffic can be monitored using pass through techniques and/or some of the network traffic can be collected and analyzed for monitoring the network traffic offline, such as in logs of network traffic) as further described herein with respect to various embodiments.

In one embodiment, network traffic is monitored using a state-based firewall. In particular, the state-based firewall can monitor traffic flows using an APP-ID engine, shown as App Signature Check component 308. For example, the monitored network traffic can include HTTP traffic, FTP traffic, DNS traffic (e.g., DNS request(s) and/or DNS response(s)), unclassified application traffic (e.g., unknown application traffic), and/or other types of traffic (e.g., traffic using other types of known or unknown protocols).

Referring to FIG. 3, network traffic monitoring begins at 302. An IP address and port component 304 determines an IP address and port number for a monitored traffic flow (e.g., a session) based on packet analysis. A policy check component 306 determines whether any policies can be applied based on the IP address and port number. As is also shown in FIG. 3, an application (app) signature check component 308 identifies an application (e.g., using an APP-ID component using various application signatures for identifying applications based on packet flow analysis). For example, APP-ID component 308 can be configured to determine what type of traffic the session involves, such as HTTP traffic, FTP traffic, DNS traffic (e.g., DNS request(s) and/or DNS response(s)), unknown traffic, and various other types of traffic, and such classified traffic can be directed to an appropriate decoder, such as decoders 312, 314, and 316, to decode the classified traffic for each monitored session's traffic flow.

As similarly described above, DNS signatures and/or IPS signatures can be applied at APP-ID component 308 using data store 318. In an example implementation, the data store can also store a table, list, or other data formatted store of other information that can be applied by the above-described IPS signature, including, for example, a list of valid TLDs and/or a list of valid dynamic DNSs (DDNS or DynDNS). In this example implementation, the data store can also store a table, list, or other data formatted store of bad domains, which can be in the form of signatures, such as DNS signatures. For example, bad domains can be periodically received (e.g., daily, hourly, or based on some other period of time or upon request) from a cloud security service (e.g., cloud security service 120 of FIG. 1) that provides firewall 300 with content updates (e.g., including signature updates, such as bad domain data including DNS signatures). In some implementations, data store 318 can be implemented as part of application (app) signature check component (308), which can be implemented during protocol decoding (312), instead of during app signature check (308). In addition, if the monitored traffic is encrypted (e.g., encrypted using SSL, SSH, or another known encryption protocol), then the monitored traffic can be decrypted using a decrypt component 310 (e.g., applying man in the middle techniques using a self-signed certificate).

In one embodiment, a known protocol decoder component 312 decodes and analyzes traffic flows using known protocols (e.g., applying various signatures for the known protocol). For example, known protocol decoder component 312 decodes and analyzes traffic flows using the DNS protocol (e.g., NXDOMAIN responses can be checked in real-time with the path decoder provided by known protocol decoder component 312) to facilitate identifying DNS responses that include an NXDOMAIN response and to track the source IP address and destination IP address associated with the NXDOMAIN response. In an example implementation, the disclosed IPS signature (e.g., implemented using a child signature and parent signature, such as further described herein) can be performed using known protocol decoder component 312 (e.g., in communication with app signature check 308 and data store 318, such as similarly described below) to perform DGA behavior detection based on passive DNS data to identify a threshold number of NXDOMAIN responses received at firewall 300 within a predetermined period of time/interval, such as further described below using the disclosed techniques. If the IPS signature is triggered indicating that DGA behavior was detected on the network, then known protocol decoder component 312 reports the detected DGA behavior to report and enforce policy component 320, such as further described below.

In another example implementation, the above-described IPS signature (e.g., implemented using a child signature and parent signature, such as further described below) can be performed using app signature check component 308 (e.g., in communication with data store 318 and known protocol decoder component 312 to facilitate decoding of passive DNS data, such as similarly described herein) to perform DGA behavior detection based on passive DNS data to identify a threshold number of NXDOMAIN responses received at firewall 300 within a predetermined period of time/interval, such as further described below using the disclosed techniques. If the IPS signature is triggered indicating that DGA behavior was detected on the network, then app signature check component 308 reports the detected DGA behavior to report and enforce policy component 320, such as further described below.

As also shown in FIG. 3, known protocol decoder component 312 also reports the monitored traffic analysis to a report and enforce policy component 320. Identified traffic (no decoding required) component 314 reports the identified traffic to the report and enforce policy component 320. An unknown protocol decoder component 316 decodes and analyzes traffic flows (e.g., applying various heuristics) and reports the monitored traffic analysis to the report and enforce policy component 320. For example, host devices (e.g., identified based on logged destination IP addresses associated with the NXDOMAIN responses that triggered the IPS signature for DGA behavior detection) can be logged and reported based on a policy using report and enforce policy 320 (e.g., a firewall policy can have one or more rules for actions to be performed in response to DGA behavior detection based on the IPS signature for DGA behavior detection being triggered). As another example, triggered DNS signatures can be reported and enforced using report and enforce policy 320.

In some implementations, various other functional architectures and flows are provided to implement the policy enforcement using techniques described herein. For example, some of these functions can be implemented in software executed on a general processor and/or some of these functions can be implemented using hardware acceleration techniques for faster packet processing of network traffic.

FIG. 4A is an example of a list of domains generated by a compromised IP address. Malware that infected a host computer generates DNS requests using a DGA. As shown in the list of domains, the infected host computer was infected with the malware from the CryptoLocker family. Typically, identifying infected computers is not difficult because the DNS requests issued by the infected host computer are composed of random characters (or alphanumeric characters), e.g., intgmxdeadnxuyla.com and axwscwsslmiagfah.com, which are illegitimate domains. The list of domains also shows legitimate DNS traffic, e.g. facebook.com and paloaltonetworks.com.

FIG. 4B is another example of a list of domains generated by a compromised IP address. Because a first generation of DGA generated domains were easily detectable because the domains were made up of random characters, a next generation of DGA was created called dictionary-based DGA. Because the dictionary-based DGA generates domains that are composed of dictionary words, the dictionary-based DGA generates domains that resemble legitimate domains. In this example, the malware family Suppobox generates domains such as, e. g., heavenpatternleader.net and shareleaderspace.net, which look like legitimate domains but are illegitimate domains. Also, the list of domains also shows legitimate DNS traffic, e.g., facebook.com and paloaltonetworks.com.

Figure 5:
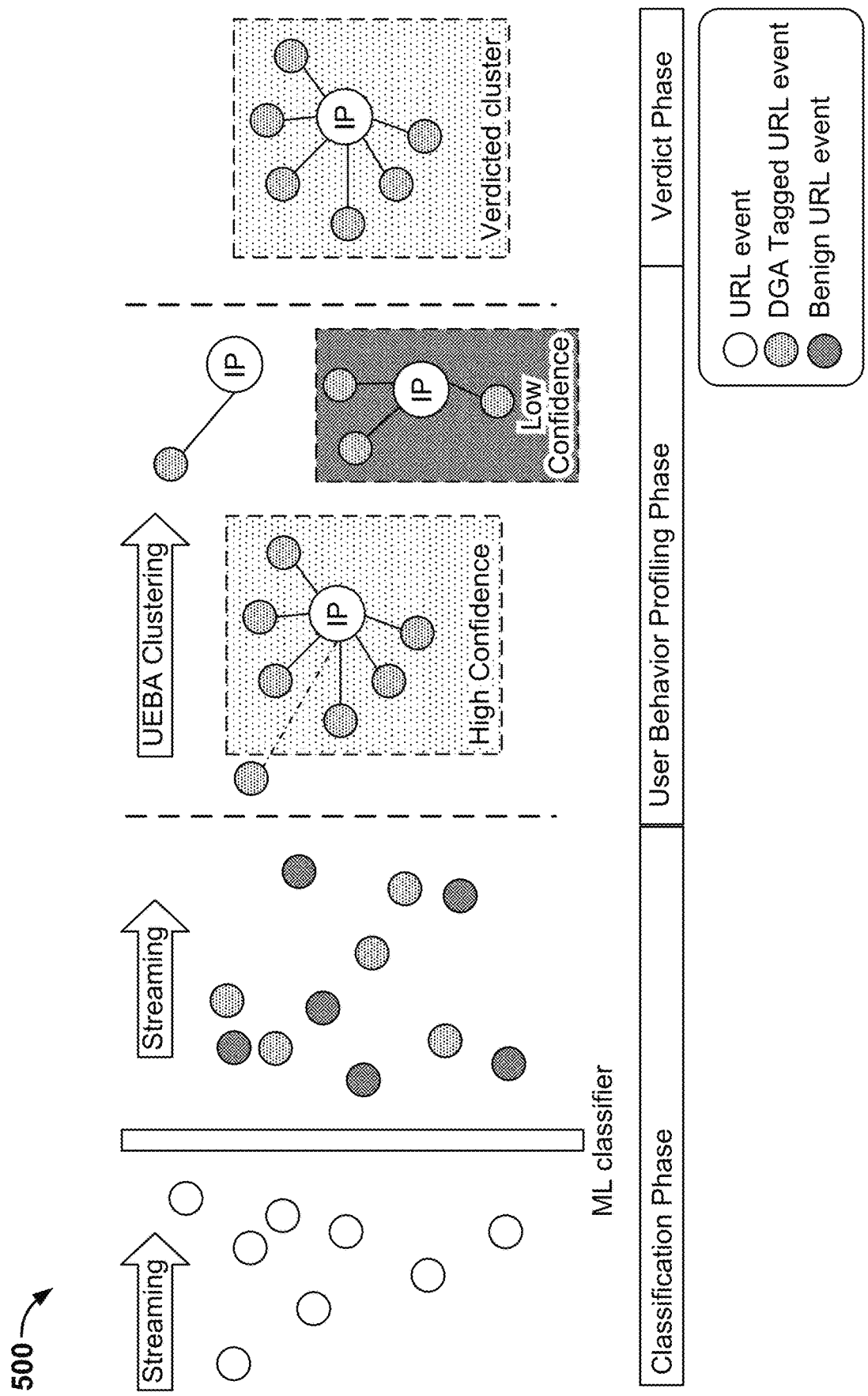
FIG. 5 is an example of a model of a process for locating a DGA compromised IP address.

FIG. 5 is an example of a model of a process for locating a DGA compromised IP address. In some embodiments, the model 500 is implemented on network security device 102 of FIG. 1. In this example, the model 500 includes three phases: a classification phase, a user behavior profiling phase, and a verdict phase.

In the classification phase, in some embodiments, a cloud security service obtains a DNS stream. In some embodiments, the DNS stream corresponds to a DNS request event stream. In some embodiments, the DNS request event stream includes enriched DNS events. Each enriched DNS event can include an enriched Uniform Resource Locator (URL) request event. Each enriched URL request event can include a domain (or URL) associated with a DNS request and a source IP address of a device issuing the DNS request. In some embodiments, the DNS stream includes DNS logs obtained from various network security devices (e.g., firewalls). In some embodiments, the model 500 is a highly distributed security service residing on the cloud. Various network security devices can send a copy of all enriched URL request events via the Internet to constitute the DNS stream. Each enriched URL request event can include a DNS request itself, a source IP of the DNS request, information (e.g., device id, device OS information, etc.) of the device initiating the DNS request, etc. In some embodiments, the DNS logs include DNS requests issued by devices protected by a network security device along with the source IP addresses of the devices issuing the corresponding DNS requests. In some embodiments, new enriched DNS events are constantly being added into the DNS stream of the model 500 with very little lag because the model 500 resides in the cloud. In some embodiments, the new enriched DNS events are added in real time. In some embodiments, the DNS logs include a plurality of enriched DNS events. The cloud security service analyzes the DNS stream to identify DGA generated domains using a machine learning classifier to generate a classification output. In some embodiments, the machine learning classifier is a DGA detection technique (e.g., dictionary-based DGA). In some embodiments, the DGA detection technique includes an entropy based DGA detection technique, a natural language processing (NLP) DGA detection technique, a deep learning DGA detection technique. In some embodiments, the DGA detection technique determines whether a domain is a DGA domain based on a measure of randomness of the characters used to form an URL in an enriched DNS event. In some embodiments, the NLP DGA detection technique is used to detect the dictionary-based DGA domain. In some embodiments, the deep learning DGA detection technique is used to detect both DGA domains and dictionary-based DGA domains. For example, the classification output includes identifying whether a domain associated with an event is determined to be generated by a DGA or not. As an example, an event that is determined not to be generated by a DGA is determined to be a benign event (or benign URL event).

After the DGA generated domains have been identified in the DNS stream, the user behavior profiling phase can be performed. In some embodiments, the user behavior profiling phase can be performed at the same time as the classification phase is performed. During the user behavior profiling phase, the cloud security service clusters DGA generated domains having the same source IP address into domain clusters. As an example, a domain cluster includes only one DGA generated domain, three DGA generated domains, or seven DGA generated domains. For example, the DGA generated domain having only one DGA generated domain could be a typographical error. For example, facebok.com was entered instead of facebook.com. As shown in FIG. 5, as soon as a domain is classified as a DGA generated domain having a source IP address that is the same as the source IP address of an existing domain cluster, the newly classified DGA generated domain can be added to the existing domain cluster (cluster having 6 domains) having the same source IP address.

In some embodiments, the cloud security service generates a verdict whether the domain cluster is associated with malware. In some embodiments, the cloud security service compares a number of domains in the domain cluster with a predefined threshold. In the event that the number of domains in the domain cluster exceeds or is equal to the predefined threshold, the cloud security service can determine that the domain cluster is associated with malware, and a source IP address associated with the domain cluster is compromised.

In some embodiments, the period of time is a moving window, so older events (events that are too old to be within the period of time) are removed from the domain cluster and new events can be analyzed to determine whether they should be associated with a domain cluster. Because of the moving window, events that are newly received can be evaluated in near real-time.

Figure 6:
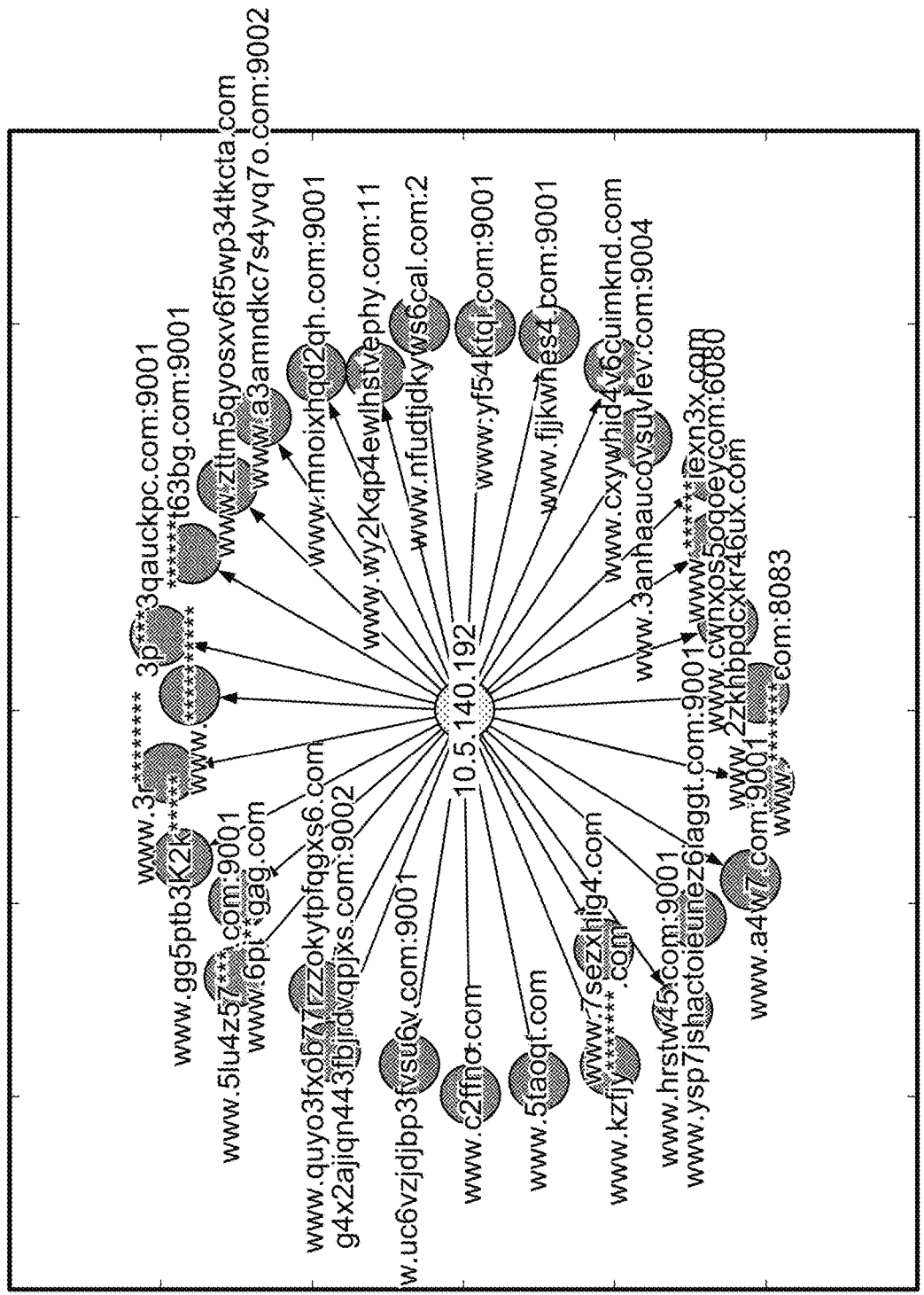
FIG. 6 is an example of a domain cluster.

FIG. 6 is an example of a domain cluster. In this example, the domain cluster 600 represents DGA generated URLs (or domains) detected over a 15-minute period of time that originated from the same source IP address (10.5.140.192). In this example, 31 different URLs (or domains) were detected to originate from the same source IP address.

Figure 7:
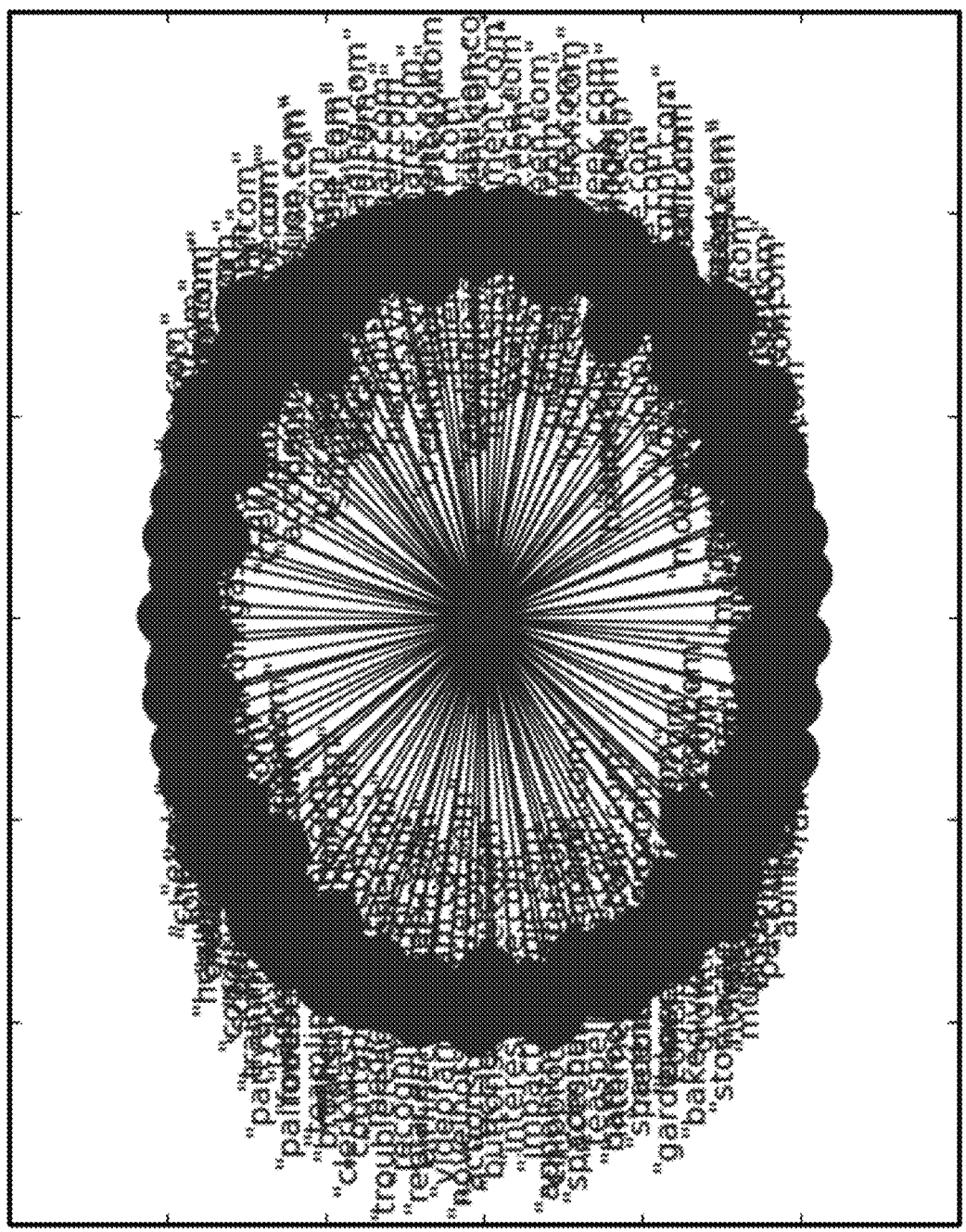
FIG. 7 is another example of a domain cluster.

FIG. 7 is another example of a domain cluster. In this example, the domain cluster 700 represents DGA generated URLs (or domains) detected over a 5-hour period of time that originated from the same source IP address. Because the domain cluster 700 has been detecting URLs (or domains) for a much longer time than the domain cluster 600 of FIG. 6, the domain cluster 700 has accumulated many more DGA generated URLs than the domain cluster 600 of FIG. 6.

Figure 8:
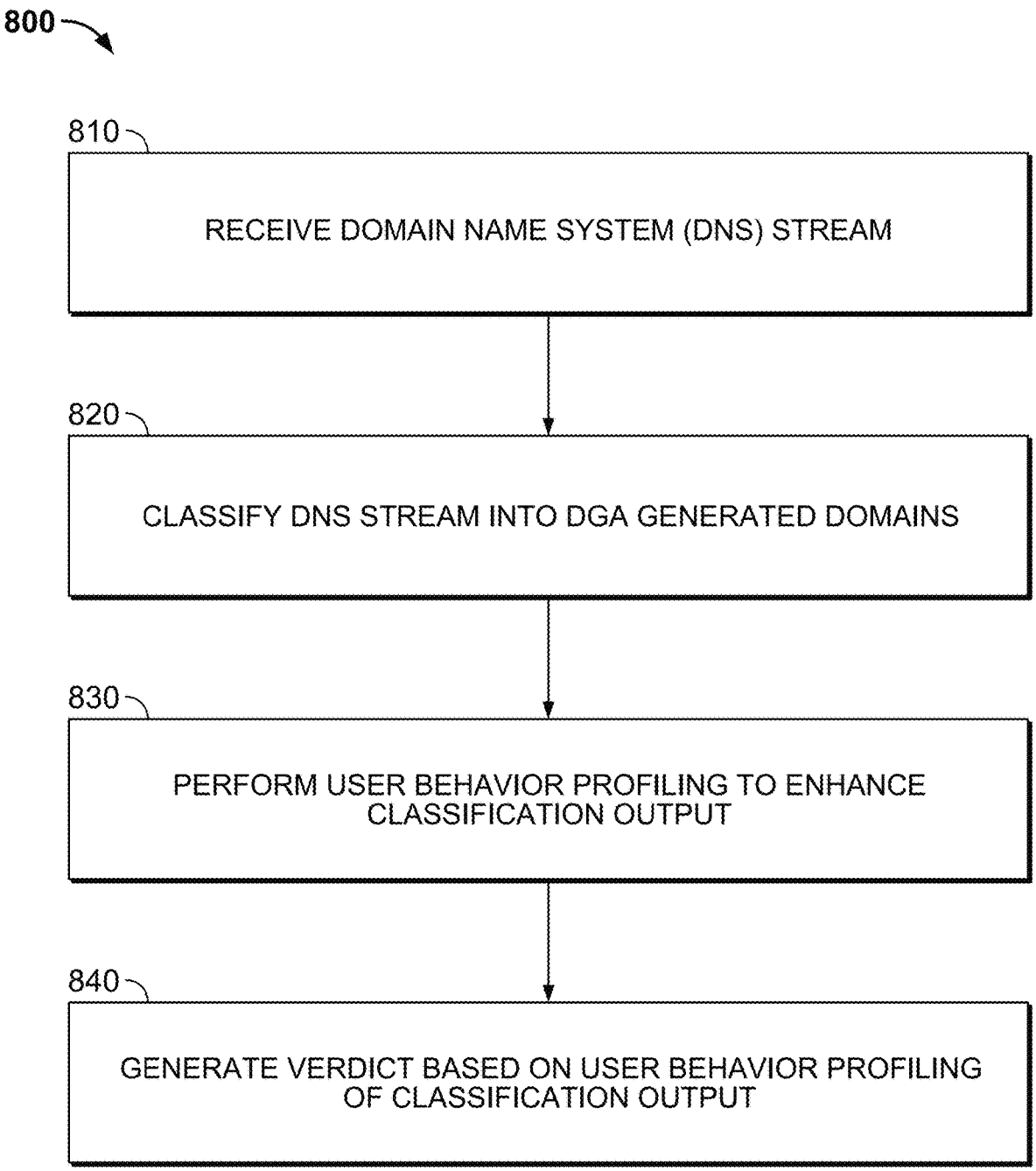
FIG. 8 is a flow diagram illustrating an embodiment of a process for locating a DGA compromised IP address.

FIG. 8 is a flow diagram illustrating an embodiment of a process for locating a DGA compromised IP address. In some embodiments, the process 800 is implemented by the cloud security service 120 of FIG. 1 and comprises:

In 810, the cloud security service receives a domain name system (DNS) stream. In some embodiments, the DNS stream includes a plurality of events where each event includes a URL and a source IP address. The URL can include a domain. In some embodiments, the DNS stream includes a plurality of logs from various network security devices or firewalls. In some embodiments, the DNS stream includes a data lake.

In 820, the cloud security service classifies the DNS stream into DGA generated domains using a machine learning classifier to generate a classification output. In some embodiments, the classifier classifies events of the DNS stream as a DGA generated domain or a benign domain. The DGA generated domain can correspond to a domain that is determined to be generated by a DGA. The benign domain can correspond to a domain that is determined not to be generated by a DGA. Typically, any machine learning classifier can be used to classify events of the DNS stream. In some embodiments, after an event is classified, a label associated with the event indicates whether the event is associated with a DGA generated domain or a benign domain.

In some embodiments, before performing the classification operation, the cloud security service pre-filters domains of the DNS stream to identify a domain in the DNS stream located on a white list including benign domains as a benign domain.

In 830, the cloud security service performs user behavior profiling to enhance the classification output. In some embodiments, the user behavior profiling includes clustering DGA generated domains having the same source IP address to obtain a DGA domain cluster. As an aspect, each DGA domain cluster includes a set of DGA generated domains that originated from the same source IP address or device having the same source IP address.

In some embodiments, the cloud security service performs the user behavior profiling on domains of a domain cluster that are obtained within a period of time. In some embodiments, the period of time is a moving window, so older events (events that are too old to be within the period of time) are removed from the domain cluster and new events can be analyzed to determine whether they should be associated with the domain cluster. Because of the moving window, events that are newly received can be evaluated in near real-time.

In 840, the cloud security service generates a verdict based on the user behavior profiling of the classification output including identifying a compromised source IP address associated with a detected DGA malware attack. In some embodiments, the verdict is determined based on a number of domains in a DGA domain cluster. For example, in response to a determination that the number of domains in the DGA domain cluster exceeds a predetermined threshold, the verdict is that the source IP address of the DGA domain cluster is compromised.

In some embodiments, before the generating of the verdict, the cloud security service checks whether any of the domains of the DGA domain cluster are NXDomains because DGA attacks typically use NXDomains because the NXDomains are generated without being registered. For example, a ratio of NXDomains of the DGA domain cluster to the registered domains of the DGA domain cluster are determined. In some embodiments, before the generating of the verdict, the cloud security service checks how long a domain of the DGA domain cluster has been registered because recently registered domains (e.g., registered less than 6 months, registered less than 1 year, etc.) of a URL are typically used as a rendezvous point by hackers. In some embodiments, a ratio of recently registered domains of the DGA domain cluster to older registered domains of the DGA domain cluster are determined. These additional checking operations can increase the accuracy and the confidence of the verdict. In some embodiments, the ratio of NXDomains to registered domains and/or the ratio of recently registered domains to older registered domains can be used in determining a confidence in the verdict. For example, a DGA domain cluster including a high ratio of NXDomains to registered domains and a low ratio of recently registered domains to older registered domains indicate a highly confident verdict.

In some embodiments, an action can be performed in response to a verdict that the source IP address of the DGA domain cluster is compromised. In some embodiments, analysis of the source IP address of the DGA domain cluster is performed to generate a malware signature. In some embodiments, the action relates to blocking the compromised source IP address associated with the detected DGA malware attack, generating an alert including the identification of the compromised source IP address, quarantining the compromised source IP address associated with the detected DGA malware attack, generating a visualization and/or a report, or any combination thereof.

Process 800 provides a higher recall rate and lower false positives than conventional DGA detection techniques and can be used with conventional DGA detection techniques (or machine learning classifiers) because the conventional DGA detection techniques typically do not utilize source IP addresses. Typically, the conventional DGA detection techniques also do not utilize user and entity behavior analytics (UEBA) concepts.

Figure 9:
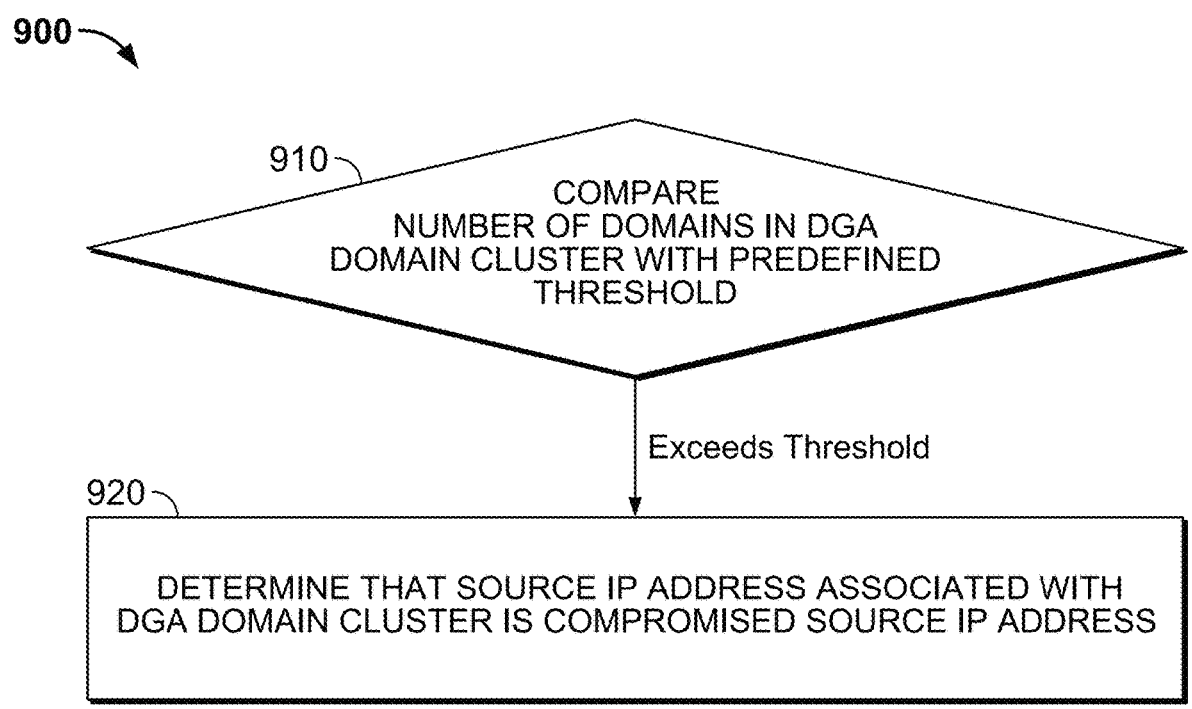
FIG. 9 is a flow diagram illustrating an embodiment of a process for generating a verdict.

FIG. 9 is a flow diagram illustrating an embodiment of a process for generating a verdict. In some embodiments, the process 900 is an implementation of operation 840 of FIG. 8 and comprises:

In 910, the cloud security service compares a number of domains in a DGA domain cluster with a predefined threshold.

In 920, in response to a determination that the number of domains in the DGA domain cluster is equal to or exceeds the predefined threshold, the cloud security service determines that the source IP address associated with the DGA domain cluster is a compromised source IP address.

Figure 10:
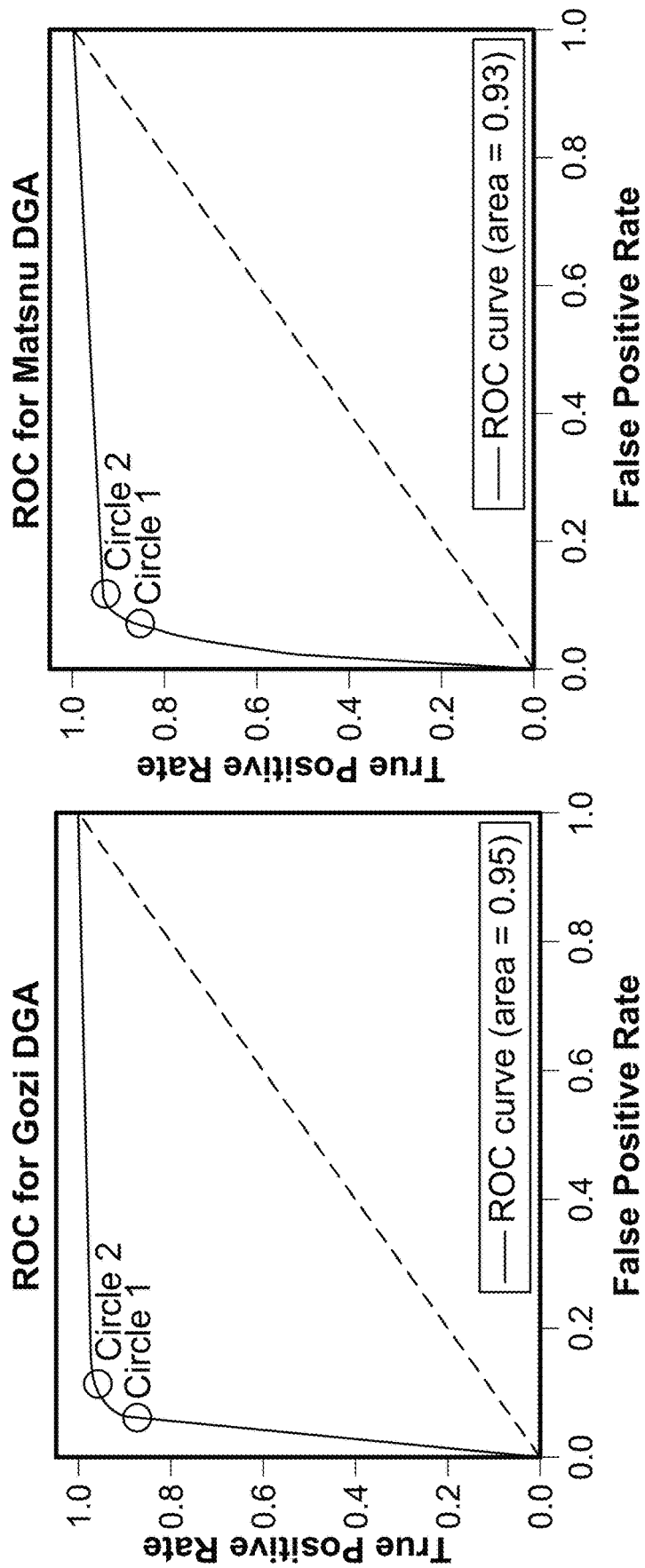
FIG. 10 illustrates an example of false positive rates from a process for locating a DGA compromised IP address.

FIG. 10 illustrates an example of false positive rates from a process for locating a DGA compromised IP address. In the example, Gozi is a set of training data (e.g., 105631 samples) where a support vector machine (SVM) is trained with the Alexa top 50K domains, and a decision tree (DT) is trained with the Alexa top 50K domains. In the example, Matsnu is a set of training data (e.g., 12666 samples) where a support vector machine (SVM) is trained with the Alexa top 50K domains and a decision tree (DT) is trained with the Alexa top 50K domains. The receiver operating characteristic (ROC) curves of FIG. 10 are examples of the performance of machine learning (ML) models. Typically, a balance between a low false positive rate and a high true positive rate (recall rate) is sought by choosing an appropriate classification decision threshold. Also, a high false positive rate is typically not desirable. For a conventional DGA detection technique, a 90% recall rate and a 8% false positive rate is an example of a "good" balance (See Circles 1), and a classification decision threshold can be selected to obtain the "good" false positive rate and the recall rate balance. In the process 800 of FIG. 8, because almost all false positive domains are filtered out, a classification decision threshold that results in a higher false positive rate and a higher recall rate can be selected. In this case, a classification decision threshold that results in a 96% recall rate and a 13% false positive rate can be selected (See Circles 2). Because the process 800 can eliminate almost all of the false positive cases from the 13% false positive rate, a high recall rate and a very low false positive rate can be achieved. As a result, in the example using the process 800, the recall rate is increased from 90% to 96%, and the recall rate drops from 8-13% to less than 1%.

As a result, a very low false positive rate is achieved while also achieving a high recall rate. Furthermore, the process 800 of FIG. 8 can achieve near real-time verdicts to detect DGA species during zero day exploits, and be highly scalable to integrate with existing DNS streaming services.

In some embodiments, verdicts associated with compromised source IP addresses can be sent to a network security research service (e.g., Palo Alto network security research service) for further systematic analysis. Because the verdicts are detected in real time or near real time, malware samples associated with the compromised source IP addresses can belong to a zero day attack campaign launch, which uses a DGA as an attack technique. For example, in the event that similar verdicts are obtained from different customers, after being systematically sent to the network security research service, malware samples can be captured via the compromised source IP address and device information of the compromised source IP address. This early detection can provide an opportunity for network security research services to alert members or entities to prepare for a forthcoming attack campaign.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a domain name system (DNS) stream, wherein the DNS stream includes logs obtained from a plurality of network security devices;
classify the DNS stream into DGA generated domains using a machine learning classifier to generate a classification output;
perform user behavior profiling to enhance the classification output, comprising to:
determine that a DGA generated domain has a same source IP address as another DGA generated domain of a DGA domain cluster, wherein the DGA domain cluster includes one or more DGA generated domain; and
in response to a determination that the DGA generated domain has the same source IP address as the other DGA generated domain, add the DGA generated domain to the DGA domain cluster;
generate a verdict based on the user behavior profiling of the classification output including identifying a compromised source IP address associated with a detected DGA malware attack, comprising to:
compare a number of domains in the DGA domain cluster with a predefined threshold; and
in the event that the number of domains in the DGA domain cluster is equal to or exceeds the predefined threshold, determine that the source IP address associated with the DGA domain cluster is the compromised source IP address; and
perform an action on the compromised source IP address, wherein the action includes one or more of the following: block the compromised source IP address associated with the detected DGA malware attack, generate an alert including identification of the compromised source IP address, quarantine the compromised source IP address associated with the detected DGA malware attack, and/or generate a visualization and/or a report; and
a memory coupled to the processor and configured to provide the processor with instructions.

2. The system of claim 1, wherein the DNS stream includes a plurality of events, wherein each event of the plurality of events comprises a DNS request and a source IP address.

3. The system of claim 1, wherein the classifying of the DNS stream into the DGA generated domains comprises to:
classify the DNS stream into the DGA generated domains using a dictionary-based DGA.

4. The system of claim 1, wherein the processor is further configured to block the compromised source IP address associated with the detected DGA malware attack.

5. The system of claim 1, wherein the processor is further configured to generate an alert including the identification of the compromised source IP address.

6. The system of claim 1, wherein the processor is further configured to quarantine the compromised source IP address associated with the detected DGA malware attack.

7. The system of claim 1, wherein the generating of the verdict comprises to generate the verdict in near real-time.

8. The system of claim 1, wherein the processor is further configured to generate visualizations, reports, and/or alerts based on the verdict.

9. A method, comprising:
receiving a domain name system (DNS) stream, wherein the DNS stream includes logs obtained from a plurality of network security devices;
classifying, using a processor, the DNS stream into DGA generated domains using a machine learning classifier to generate a classification output;
performing, using the processor, user behavior profiling to enhance the classification output, comprising:
determining that a DGA generated domain has a same source IP address as another DGA generated domain of a DGA domain cluster, wherein the DGA domain cluster includes one or more DGA generated domain; and
in response to a determination that the DGA generated domain has the same source IP address as the other DGA generated domain, adding the DGA generated domain to the DGA domain cluster;
generating, using the processor, a verdict based on the user behavior profiling of the classification output including identifying a compromised source IP address associated with a detected DGA malware attack, comprising:
comparing a number of domains in the DGA domain cluster with a predefined threshold; and
in the event that the number of domains in the DGA domain cluster is equal to or exceeds the predefined threshold, determining that a source IP address associated with the DGA domain cluster is the compromised source IP address; and
performing an action on the compromised source IP address, wherein the action includes one or more of the following: blocking the compromised source IP address associated with the detected DGA malware attack, generating an alert including identification of the compromised source IP address, quarantining the compromised source IP address associated with the detected DGA malware attack, and/or generating a visualization and/or a report.

10. The method of claim 9, wherein the DNS stream includes a plurality of events, wherein each event of the plurality of events comprises a DNS request and a source IP address.

11. The method of claim 9, wherein the classifying of the DNS stream into the DGA generated domains comprises:
classifying the DNS stream into the DGA generated domains using a dictionary-based DGA.

12. A computer program product embodied in a non-transitory computer readable medium and comprising computer instructions for:
receiving a domain name system (DNS) stream, wherein the DNS stream includes logs obtained from a plurality of network security devices;
classifying the DNS stream into DGA generated domains using a machine learning classifier to generate a classification output;
performing user behavior profiling to enhance the classification output, comprising:
determining that a DGA generated domain has a same source IP address as another DGA generated domain of a DGA domain cluster, wherein the DGA domain cluster includes one or more DGA generated domain; and
in response to a determination that the DGA generated domain has the same source IP address as the other DGA generated domain, adding the DGA generated domain to the DGA domain cluster;
generating a verdict based on the user behavior profiling of the classification output including identifying a compromised source IP address associated with a detected DGA malware attack, comprising:
comparing a number of domains in the DGA domain cluster with a predefined threshold; and
in the event that the number of domains in the DGA domain cluster is equal to or exceeds the predefined threshold, determining that a source IP address associated with the DGA domain cluster is the compromised source IP address; and
performing an action on the compromised source IP address, wherein the action includes one or more of the following: blocking the compromised source IP address associated with the detected DGA malware attack, generating an alert including identification of the compromised source IP address, quarantining the compromised source IP address associated with the detected DGA malware attack, and/or generating a visualization and/or a report.

* * * * *